United States Patent [19]

Dorst et al.

[11] Patent Number: 4,969,185
[45] Date of Patent: Nov. 6, 1990

[54] AUTOMATED BOOKING OF TELECOMMUNICATIONS CALLS

[75] Inventors: Gary L. Dorst, Brookfield; Francis J. Pope, III, Naperville, both of Ill.

[73] Assignee: AT&T Bell Laboratories, Murray Hill, N.J.

[21] Appl. No.: 459,115

[22] Filed: Dec. 29, 1989

[51] Int. Cl.5 .............................................. H04M 3/48
[52] U.S. Cl. .................................... 379/209; 379/115
[58] Field of Search ................ 379/114, 209, 115, 112

[56] References Cited

U.S. PATENT DOCUMENTS

| | | | |
|---|---|---|---|
| 3,364,313 | 1/1968 | Scheinman | 179/27 |
| 3,484,560 | 12/1969 | Jaeger, Jr. et al. | 179/27 |
| 3,854,014 | 12/1974 | Akin et al. | 379/209 |
| 4,054,756 | 10/1977 | Comella et al. | 179/18 B |
| 4,656,624 | 4/1987 | Collins et al. | 370/60 |
| 4,797,910 | 1/1989 | Daudelin | 379/67 |
| 4,899,375 | 2/1990 | Bauer et al. | 379/264 |

Primary Examiner—Stafford D. Schreyer
Attorney, Agent, or Firm—Werner Ulrich

[57] ABSTRACT

An automatic call booking arrangement is disclosed for establishing a booked call between a back party and a forward party. A booked call is reserved by storing call booking ticket data regarding the call in a call booking database. A call booking scanning (CBS) process system continually scans call booking ticket data to determine whether it is time to establish a booked call. At the time a booked call is to be established, the CBS process sends the call booking ticket data to an automatic call booking (ACB) process. In response to receipt of the call booking ticket data, the ACB process uses the data to establish automatically a call between the back party and the forward party.

18 Claims, 5 Drawing Sheets

FIG. 2
PRIOR ART
CALL BOOKING TICKET
| BACK PARTY # | FORWARD PARTY # | COC | TOC | CALL TIME |
|---|---|---|---|---|
| 202 | 204 | 206 | 208 | 210 |
FIG. 7
PRIOR ART
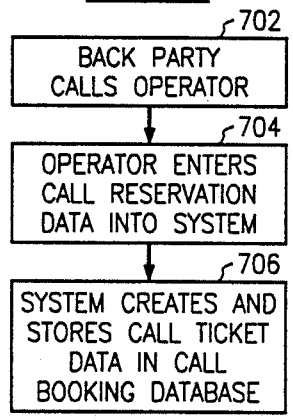
FIG. 3
PRIOR ART
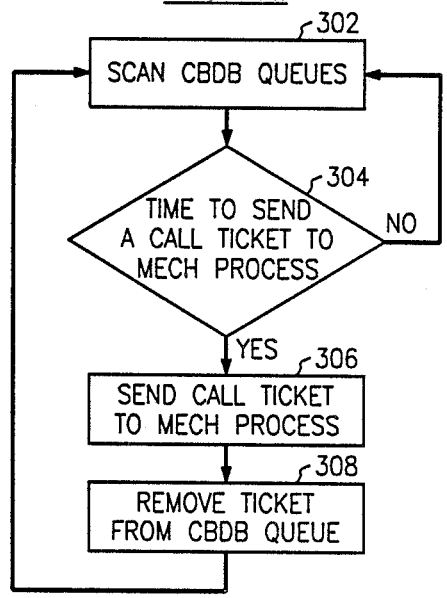

AUTOMATED BOOKING OF TELECOMMUNICATIONS CALLS

CROSS REFERENCE TO RELATED APPLICATIONS

This application is related to the application Ser. No. 388,188, entitled "Semi-Automated Operator Assistance Telecommunication Calls", and application Ser. No. 388,189, entitled "Time and Charges Information Delivery for Operator Assistance Telecommunication Calls", both filed concurrently on July 31, 1989, and assigned to the same assignee as this application. This invention relates to the booking of telecommunications calls.

PROBLEM

Call booking is a method used in many countries around the world by a telephone customer (calling party) when a called party is unavailable to receive his/her call. The calling (back) party "books" a call to the called (forward) party, thereby making a reservation with a telephone switching system to have the call placed at a later, specified time. The International Operator Services Position System (OSPS) feature in the 5ESS ® Switch manufactured by AT&T Technologies, Inc., is a typical example of a switch that provides a call booking capability. The call booking method comprises (1) a back party makes a call booking request to an operator; (2) the operator creates "call booking ticket" data which is stored in a call booking database; (3) at the time the booked call is to be made, the call booking database sends the call booking ticket data to an operator; and (4) the operator manually sets up th ecall between the back party and a forward party.

The call booking methods of the prior art requires a large amount of expensive operator work time in setting up a booked call. The prior art does not teach arrangements for providing low cost booked calls.

SOLUTION

The above problem is solved and an advance is made in the art in accordance with a new method and apparatus of our invention featuring the automatic setup of booked calls. At the time a booked call is to be made, a call booking database sends call booking ticket data to an operator assistance system. In a departure from the art, responsive to receipt of this data from the call booking database at an appropriate time, the operator assistance system sets up the booked call automatically. In one specific embodiment, the call booking ticket data is sent to an Automated Call Booking (ACB) process of the operator assistance system. After determining that a trunk to the called (forward) party is available, the ACB process places a call to the calling (back) party. The ACB process places the back party on hold after making a connection, and plays a message to the back party, telling the back party that the booked call is being set up. The ACB process then takes the back party off hold and places a call to the forward party. When the forward party answers, an operator position is seized prior to connecting the forward and back parties if the call is a collect or person-to-person call; otherwise, an operator position is not seized. If the call setup attempt fails to either the back party or the forward party, the call is automatically rebooked by the ACB process.

Thus, without any action by an operator, the booked call is set up. Advantageously, a booked call is set up without using operator work time.

BRIEF DESCRIPTION OF THE DRAWING

FIGS. 2-7 are data layouts and flow diagrams of methods of processing booked calls in accordance with the invention.

DETAILED DESCRIPTION

Figure 1:
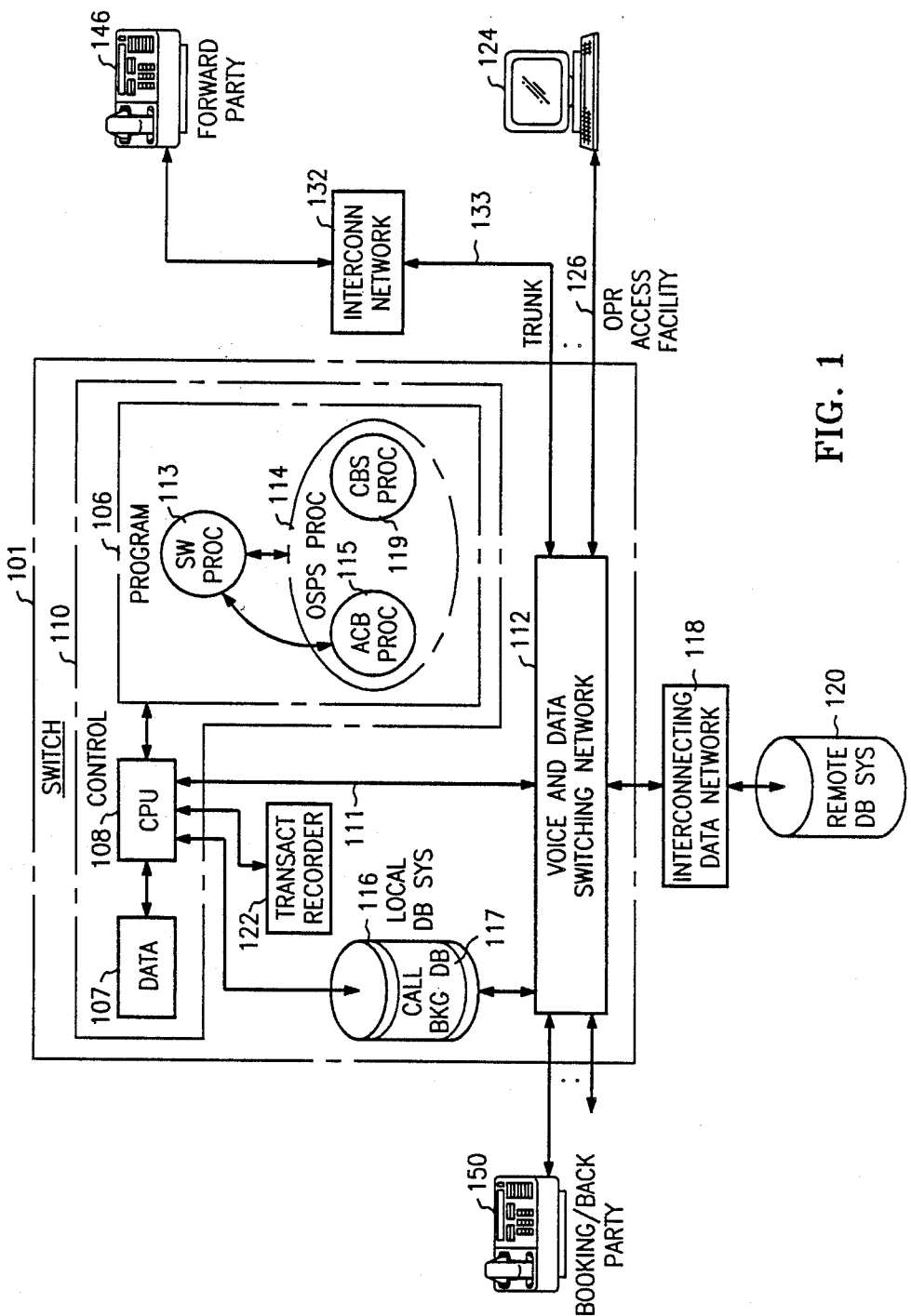
FIG. 1 is a block diagram of a switching system for processing booked calls in accordance with the methods of FIGS. 2-7.

FIG. 1 is a block diagram of a system illustrating one embodiment of the present invention. The system comprises a calline/booking party station 150 connected to a switching system 101 via a line 160, and a forward party station 146, connected to the switching system 101 via interconnection network 132 and trunk 133.

The switching system (switch) 101 is a 5ESS switch, extensively described in *AT&T Technical Journal*, vol. 64, no. 6, part 2, pp. 1305-1564, Jul./Aug. 1985, which also serves as an Operator Services Position System (OSPS) as described in N.X. DeLessio Et al.: "An Integrated Operator Services Capability for the 5ESS Switching System", *International Switching Symposium*'84, (Florence), Session 22C, Paper 3, pp. 1-5, May 1984. The change required in the switching system to implement the present invention is the addition of a program in the control 110 of the switch 101 for executing the tasks described in the flow charts of FIGS. 3-6. The control 110 comprises a central processing unit 108, a program 106 for controlling the operations of the central porcessing unit, and a data store 107 for storing call data. The program 106 comprises a switching process 113 to control the setting-up (establishment) and disconnecting of calls and, an operator services position system (OSPS) process 114 to control operator assistance calls including an Automated Call Booking (ACB) process 115 to atuomate set-up operations of operator assistance calls, and a Call Booking Scanning (CBS) process 119 to scan call booking data. The switch also comprises a local database system 116 for storing data such as: (1) customer lines, such as line 160, connected to the system, (2) interconnecting networds 132, (3) trunks, such as trunk 133 connected to the system, and (4) data about operator positions connected to the system. The local database 116 also comprises a call booking database 117 for storing data regarding booked calls, such as call booking tickets. A transaction recorder 122 is used for recording billing data. The switch also comprises a voice and data switching network 112 which is used for transmitting data signals among control unit 110, interconnecting data network 118, and operator access facility 126; and for transmitting voice signals among trunks; coming into the system, such as trunk 133 to interconnecting network 132; customer lines such as customer line 160; and operator access facilities such as operator access facility 126. The interconnecting network 132 which, for different connections includes zero, one or more switching systems, is used for accessing the forward party station 146 from switch 101. Operator position 124, connected to the voice and data switching network 112 by operator access facility 1268 comprises a voice interface, such as a headset, and a video terminal for displaying data obtained from control 1108 local database system 116, and remote database system 120. While a typical system would have many operator positions attached, for clarity, only one is shown herein. In the preferred embodiment, facility 126 is an integrated services digital network (ISDN) facility for carrying data and digitized voice signals. Remote database system 120 is connected to voice and data switching network 112 via interconnecting data network 118. Voice and data switching network 112 is connected to control unit 110 via a control connection 111. Interconnecting data network 118 and remote database system 120 are used for obtaining data about the calling or called terminal and/or called station when this data is not available in the local database system 116.

In this specific embodiment and example of the present invention, a calling (back) party books a call from the telephone 150 to an operator at operator position 124. The operator creates an electronic call booking ticket which is stored in the call booking database 117. The CBS process 119 continually scans the call booking database 117 to determine whether it is time to place a booked call. At a time specified by the back party to place the booked call, the CBS process 119 sends the call booking ticket data to teh ACB Process 115 of the OSPS process 114. The ACB process 115 uses the information provided in the call booking ticket to set up a connection to the back party 150 and to set up a connection to a called (forward) party station 146. After a connection to the forward party station 146 is set up via trunk 133 and interconnecting network 132 to forward party station 146, and an answer from the forward party station 146 is detected in the voice and data switching network 112 and relayed via control connection 111 to control 110, control 110 informs the ACB process 115 and causes a connection to be set up between the back party station 150 and the forward party station 146. If the back party call is a collect or person-to-person call, the ACB process 115 alerts the OSPS process 114 that an operator position should be queued, and an operator position connected to the call when available.

FIG. 2 is a data layout of the data of an electronic call booking ticket; this layout is as in the prior art. The call booking ticket data comprises a back party number (block 202) and a forward party number (block 204). The ticket also comprises a class of charge (COC) field (block 206) indicating a whether a booked call is collect or paid for by the back party, a type of charge (TOC) field (block 208) indicating whether the booked call is person-to-person or station-to-station, and a call time (block 210) which indicates the time that the booked call is to be placed.

FIG. 3 is a program flow diagram of a call booking scanning (CBS) process. This process exists in the prior art. The CBS process begins by scanning the call booking database (CBDB) queues to determine if any of the tickets in the queues have a call time field (i.e., segment 210) value equal to the switching system clock time (action block 302). If the ticket call time field value does not equal the switching system clock time (test 304), the CBS process continues to scan the CBDB until all tickets have been scanned. If a call ticket call time field value does equal the switching system clock time, this indicates that it is time for the ACB process to place a booked call. The CBS process sends the call ticket to the ACB process (action block 306), and then removes the call ticket from the CBDB queue (action block 308), after which the scanning process (action block 302) continues.

Figure 4:
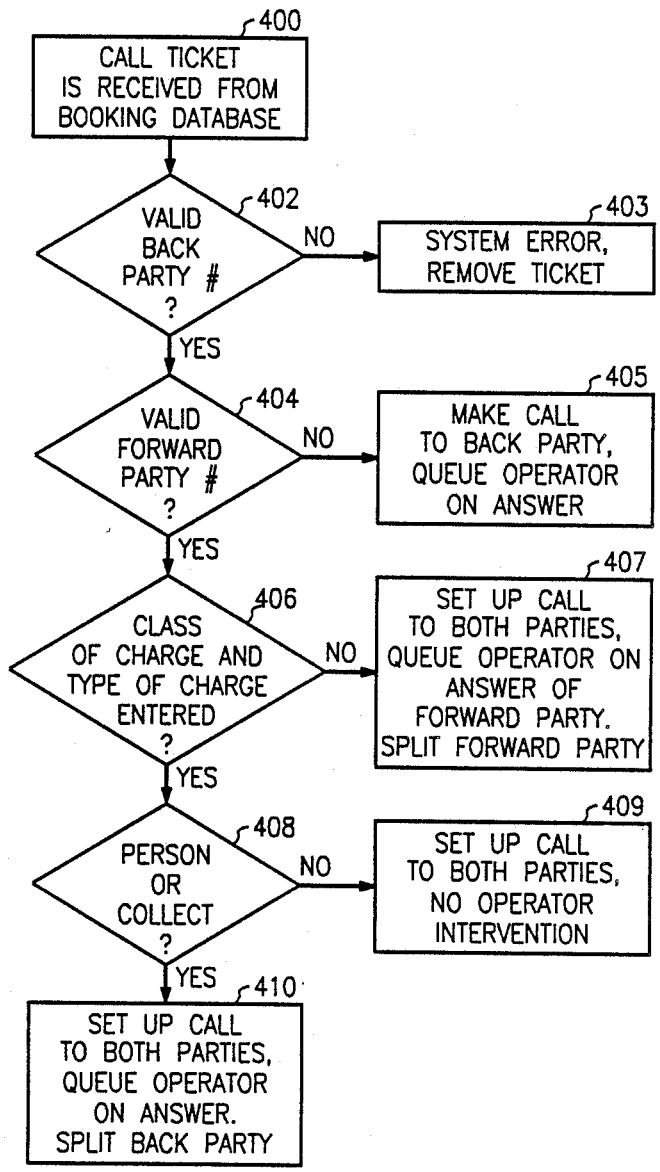

FIG. 4 is a program flow diagram describing the actions taken by the ACB process after receiving a call ticket from the CBS process. The ACB process first receives a call ticket from the CBS process (action block 400). The ACB process next checks whether the back party number in the call ticket is a valid telephone number (test 402). If it is not a valid number, the ACB process reports a system error to the OSPS process and removes the call ticket (action block 403). If the back party number is valid, the process next checks whether the forward party number is valid (test 404). If the forward party number is not valid the ACB process places a call to the back party and queues an operator whenn the back party answers. The operator asks the backj party for a correct (valid) forward party number and enters that number, or asks the back party to re-book or reoriginate the call. If the forward party number is valid the process next checks whether the thicket contains a class of charge value (test 406). If not, the ACB process proceeds as if the call is collect and sets up a call to both the back party and forward party, queues an operator when the forward party answers, and splits (i.e., places on hold) the forward party (action block 407). If the class of charge has been entered into the call ticket, the ACB process next checks whether the call is a collect call (test 408). If not, then the call is paid for by the back party and the ACB process sets up a call to both parties (back and forward) with no operator intervention (action block 409). If the call is collect, the ACB process sets up a call to both parties, queues an operator when the forward party answers, and splits (i.e. places on hold) the back party (action block 410).

Figure 5:
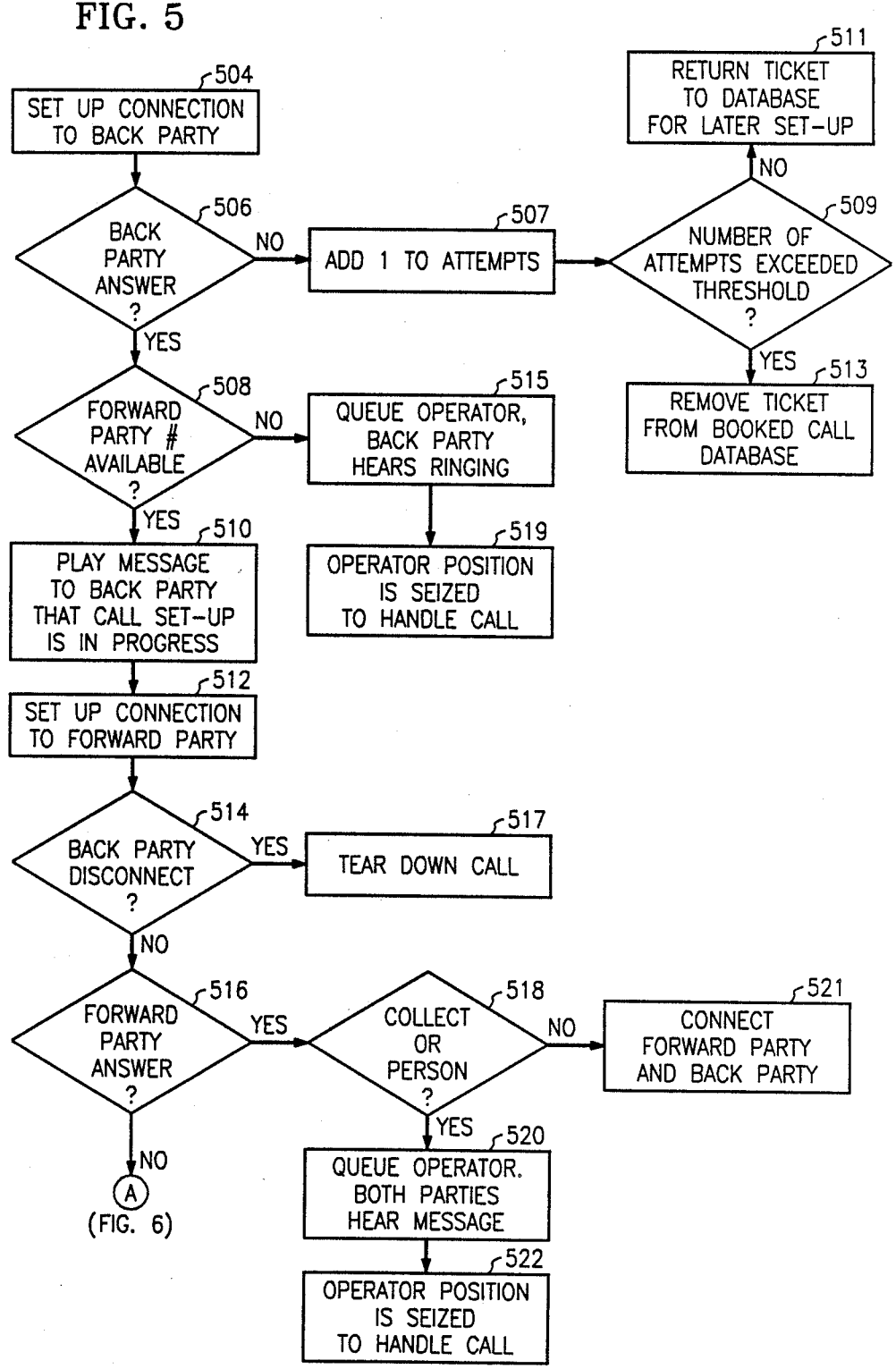
Figure 6:
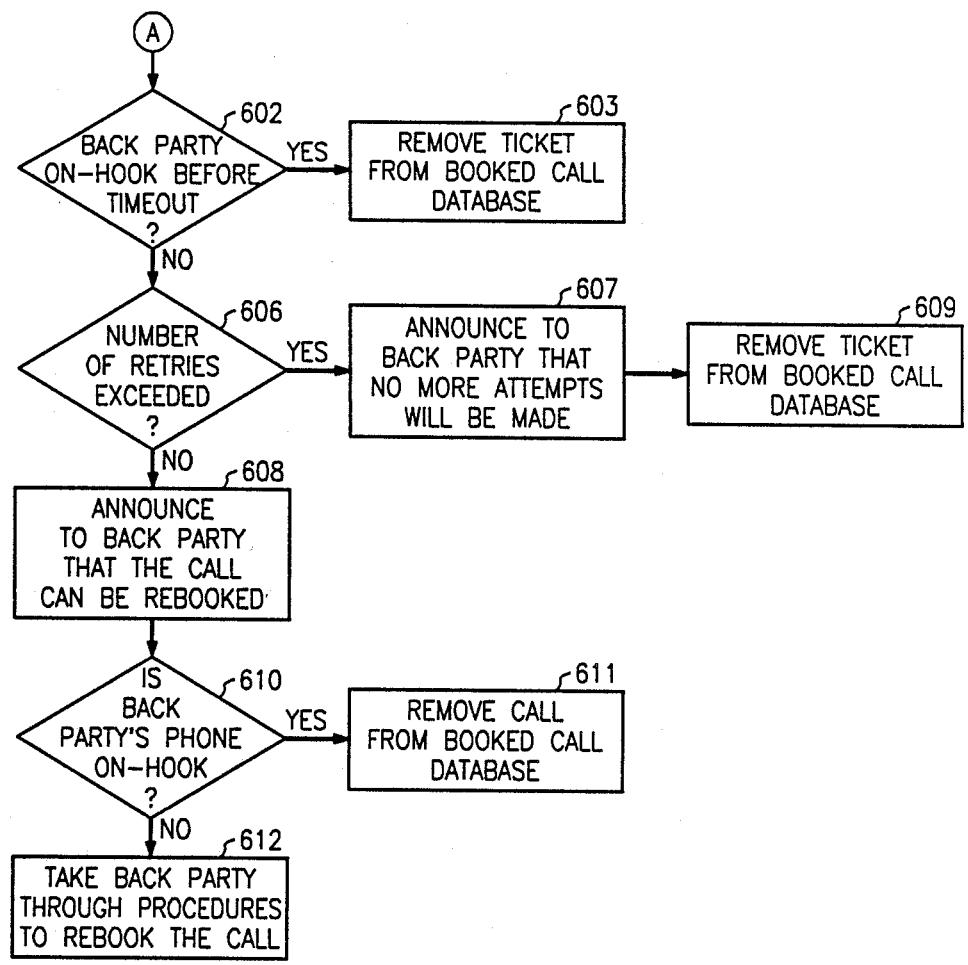

FIG. 5 is program flow diagram describing the actions taken by the ACB process to set up a booked call. Effectively, FIG. 5 and FIG. 6 are an expansion of the set-up operations of blocks 407, 409 and 410. The ACB process first sets up a connection to the back party (action block 504). The process then waits for the back party to answer (test 506). If the back party does not answer, an ATTEMPTS variable that keeps track of the number of the number calls made to the back party with no answer, is incremented by one (action block 507). The process next checks whether the ATTEMPTS variable has exceeds its threshold value (test 509). If it does not exceed its threshold value, the call ticket for this booked call is returned to the CBDB for later setup (action block 511); otherwise, the call ticket is removed from the CBDB, and the call attempt is aborted (action block 513).

If the back party does answer, the ACB process next checks whether the forward party number is in the call ticket (test 508). If the number is not available, the ACB process then queues an operator and the back party hears ringing (action block 515). An operator position is then seized and the booked call is set up under operator control (action block 519). If the forward party number is available, the process plays a message to the back party stating that call setup is in progress (action block 510), and sets up the connection to the forward party (action block 512). While the connection to the forward party is being set up, the process checks whether the back party has disconnected (gone on-hook)(test 514). If so, the process tears down the call and the sequence is aborted (action block 517). If not, the process next checks whether the forward party has answered (test 516). If the forward party does answer the call, the ACB process checks whether the class of charge is collect or the type of charge is person-to-person (test 518). If not, the process connects the two parties and the call sequence is ended (action block 521). If the call is collect or person-to-person, the ACB process queues an operator, and both parties hear a message describing the status of the booked call (action block 520). An operator position is then seized and the call is set up under operator control (action block 522). If the forward party does not answer the call, the ACB process takes the actions described in FIG. 6.

FIG. 6 describes the actions taken by the ACB process during booked call setup when the forward party does not answer. The process first checks whether the back party has disconnected (gone on-hook) (test 602). If so, the call ticket for this call is removed from the CBDB (action block 603). If the back party is still off-hook, the process checks whether the threshold value for the number of retries has been exceeded (test 606). If the threshold has been exceeded, the process announces to the back party that no more attempts will be made to book the call (action block 607) and removes the call ticket from the CBDB (action block 609). If the threshold number of retries has not been exceeded, the ACB process sends an announcement to the back party sttating that the call can be rebooked (action block 608). The process then checks whether the back party's phone is on-hook following the announcement (test 610). If so, the call ticket is removed from the CBDB, and the sequence is ended (action block 611). Otherwise, if the back party's phone is off-hook, the ACB process takes the back party through procedures to rebook the call (action block 612).

In this preferred embodiment of the invention, the ACB process is an adaptation of an existing More Efficient Call Handling (MECH) process described in Bauer et al.: U.S. application Ser. No. 248,459, filed Sept. 23, 1988. The MECH process is used for automating the set-up of unbooked operator assistance calls from the point in time where the class of charge of the call has been determined. Many of the operations of MECH and ACB are similar or the same, so that in any system which uses MECH type processes and in which an ACB process is to be implemented, it is desirable to combine the two.

While the specific embodiment described herein uses an operator position connected to a central office, the principles of this invention can be readily adapted for use for booking calls from a Private Branch Exchange (PBX) or other private network, and an attendant.

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. A method of establishing a call from a back party to a forward party comprising the steps of:
   the back party entering a reservation into a telephone switching system to place the call;
   responsive to said entering, the system storing call reservation ticket data regarding the call;
   at a time specified by the call ticket data, the system retrieving the stored ticket data to place the call; and
   responsive to said retrieving of said ticket data, the system automatically establishing a connection to the forward party prior to connecting an operator position to said call.

2. The method of claim 1 wherein the step of storing comprises storing a back party telephone number, a forward party telephone number, the class of charge of the call, the type of charge of the call and the time the call is to be set-up.

3. The method of claim 1 wherein the step of storing comprises storing the ticket data in a call reservation database.

4. The method of claim 3 wherein the retrieving step comprises:
   scanning the database to find the ticket data; and
   extracting the ticket data for establishing the call.

5. The method of claim 4 wherein the retrieving step comprises retrieving a back party telephone number, a forward party telephone number and a class of charge.

6. The method of claim 1 wherein the establishing step comprises:
   determining that a trunk to the back party is available;
   establishing a connection to the back party;
   establishing a connection to the forward party; and
   establishing a connection between the back party and the forward party without connecting an operator position to said call.

7. The method of claim 1 wherein said call is a collect call further comprising the step of:
   responsive to detecting an answer signal from the forward party, attaching an operator position prior to establishing a connection between the back party and the forward party.

8. The method of claim 1 wherein the establishing step comprises:
   an answer signal is not detected from the forward party;
   responsive to said undetected answer signal, the system automatically entering a new reservation for the call; and
   responsive to said entering a new reservation, the system storing new ticket data for the call.

9. A method of establishing a call from a back party to a forward party comprising the steps of:
   the back party entering a reservation into a telephone switching system to place the call;
   responsive to said entering, the system storing call reservation ticket data regarding the call in a call reservation database;
   at a time specified by the stored ticket data, the system retrieving the stored ticket data from the database to establish the call;
   wherein the retrieving step comprises scanning the database to find the stored ticket data, comprising a back party telephone number, a forward party telephone number and a class of charge, to establish the call; and
   responsive to said retrieving, determining that a trunk to the back party is available;
   responsive to said determining, establishing a connection to the back party;
   responsive to said establishing a connection to the back party, playing a message stating that the reserved call is being set-up and placing the back party on hold;
   establishing a connection to the forward party prior to connecting an operator position to said call; and
   responsive to the detecting an answer signal from the forward party, establishing a connection between the back party and the forward party.

10. Apparatus for establishing a call from a back party to a forward party comprising:
   a switching network, connectable to the back party and the forward party;
   control means, operable under the control of a program process, for controlling a reservation of the call in the switching system and automatic establishment of a connection to the forward party via the switching network and prior to connecting an operator position to said call at a reserved time.

11. In a telephone switching system, apparatus for booking a call from a back party to a forward party comprising:
   means for accepting a reservation of the call in the switching system;
   means, responsive to the reservation of the call, for storing call reservation ticket data for the call;
   means for retrieving the call reservation ticket data; and
   means, responsive to said means for retrieving, for establishing a connection to the back party and the forward party prior to connecting an operator position to said call.

12. In a telephone switching system, apparatus for establishing a booked call from a party to a forward party comprising:
   means for accepting a reservation of the call in the switching system;
   means, responsive to the reservation of the call, for storing call reservation ticket data for the call in a call booking database;
   means for retrieving the call reservation ticket data at a time specified by the call ticket data; and
   means, responsive to said retrieving, for automatically establishing a call between the back party and the forward party;
   wherein said retrieving means comprises means for scanning the database to find the stored ticket data to establish the call, said data comprising a back party telephone number, a forward party telephone number and a class of charge; and
   wherein said establishing means comprises means for determining that a trunk to the back party is available; means for establishing a connection to the back party; means, responsive to establishing a connection with the back party, for playing a message stating that the reserved call is being established and for placing the back party on hold; means for establishing a call to the forward party; and means, responsive to detecting an answer from the forward party, for establishing a connection between the back party and the forward party.

13. A method of establishing a booked call from a back party to a forward party comprising the steps of:
   a telephone switching system retrieving stored call ticket data for said booked call from a database at a time specified by said ticket data; and
   responsive to said retrieving of said ticket data, the system automatically establishing a connection to the forward party prior to connecting an operator position to said call.

14. The method of claim 13 wherein the retrieving step comprises:
   scanning a database comprising call ticket data for a plurality of calls to find the call ticket data for said booked call; and
   extracting the ticket data for establishing the call.

15. The method of claim 13 wherein the establishing step comprises:
   determining that a trunk to the back party is available;
   establishing a connection to the back party;
   establishing a connection to the forward party; and
   establishing a connection between the back party and the forward party without connecting an operator position to said call.

16. The method of claim 13 wherein said call is a collect call further comprising the step of:
   responsive to detecting an answer signal from the forward party, attaching an operator position prior to establishing a connection between the back party and the forward party.

17. The method of claim 13 wherein the establishing step comprises:
   an answer signal is not detected from the forward party;
   responsive to said undetected answer signal, the system automatically entering a new reservation for the call; and
   responsive to said entering a new reservation, the system storingg new ticket data for the call.

18. In a telephone switching system, apparatus for booking a call from a back party to a forward party comprising:
   means for retrieving call reservation ticket data for said call; and
   means, responsive to said means for retrieving, for establising a connection to the back party and the forward party prior to connecting an operator position to said call.

* * * * *

UNITED STATES PATENT AND TRADEMARK OFFICE
CERTIFICATE OF CORRECTION

PATENT NO. : 4,969,185
DATED : November 6, 1990
INVENTOR(S) : Gary L. Dorst and Francis J. Pope It is certified that error appears in the above-identified patent and that said Letters Patent is hereby corrected as shown below:

Column 7, line 25, "from a party" should be "from a back party";
Column 8, line 41, "storingg" should be "storing".

Signed and Sealed this

First Day of September, 1992

Attest:

DOUGLAS B. COMER

*Attesting Officer*    *Acting Commissioner of Patents and Trademarks*